United States Patent [19]
Granella

[11] Patent Number: 5,403,122
[45] Date of Patent: Apr. 4, 1995

[54] PROCESS, IN PARTICULAR TO INSTALL SEWER PIPES AND A DEVICE TO CARRY OUT THE PROCESS

[76] Inventor: Bruno Granella, Laurstrasse 22, 5200 Brugg, Switzerland

[21] Appl. No.: 81,260

[22] PCT Filed: Nov. 5, 1992

[86] PCT No.: PCT/CH92/00223

§ 371 Date: Jun. 21, 1993

§ 102(e) Date: Jun. 21, 1993

[87] PCT Pub. No.: WO93/09305

PCT Pub. Date: May 13, 1993

[30] Foreign Application Priority Data

Nov. 6, 1991 [CH] Switzerland ............... 03235/91

[51] Int. Cl.⁶ ............................................. F16L 1/028
[52] U.S. Cl. ................................... 405/184; 405/154
[58] Field of Search .................... 405/154, 156, 184

[56] References Cited

U.S. PATENT DOCUMENTS

| | | | |
|---|---|---|---|
| 4,309,128 | 1/1982 | Williams | 405/154 |
| 4,507,019 | 3/1985 | Thompson | 405/154 |
| 4,886,396 | 12/1989 | Akesaka | 405/184 |
| 5,048,793 | 9/1991 | Mefford et al. | 405/184 X |
| 5,076,731 | 12/1991 | Luksch | 405/154 |
| 5,078,546 | 1/1992 | Fisk et al. | 405/156 |
| 5,112,158 | 5/1992 | McConnell | 405/154 |
| 5,127,481 | 7/1992 | Hesse | 405/156 |
| 5,207,533 | 5/1993 | Federspiel et al. | 405/156 |

FOREIGN PATENT DOCUMENTS

| | | |
|---|---|---|
| 0411278 | 2/1991 | European Pat. Off. |
| 3620026 | 9/1987 | Germany |
| 3715653 | 12/1988 | Germany |
| 3801824 | 7/1989 | Germany |
| 54094 | 2/1990 | Japan ............... 405/154 |
| 178495 | 7/1990 | Japan ............... 405/154 |
| 2167156 | 5/1986 | United Kingdom |

*Primary Examiner*—Randolph A. Reese
*Assistant Examiner*—John Ricci
*Attorney, Agent, or Firm*—Wenderoth, Lind & Ponack

[57] ABSTRACT

A sewer pipe to be replaced is worked, starting from a manhole, by a cutter head which is braced at a front end of a new pipe to be forced in from the manhole. The cutter head is guided in the pipe to be worked during the cutting operation. Such guidance is accomplished by a guide mechanism, which is mounted on the front on the new pipe and which is pressed with adjustable pressure against the inner wall of the old pipe and is slid therein. The cutter head is prevented from shifting sideways and enables that even reinforced pipes can be worked. The new pipe can be laid on the same level owing to an eccentric adjustability of the cutter head relative to the old pipe, despite any eventual change in diameter.

27 Claims, 8 Drawing Sheets

PROCESS, IN PARTICULAR TO INSTALL SEWER PIPES AND A DEVICE TO CARRY OUT THE PROCESS

BACKGROUND OF THE INVENTION

Whole sections of current sewer systems in Europe are in need of replacement due to corrosion, sinking or other damages of leaking sewer pipes and as a consequence of undersizing, because in many cases original planning of housing development and the volume of sewerage per inhabitant were insufficient for the later development.

To replace such sewer pipe, there exists a press pipe tunnelling process, in which pits or manholes are excavated at intervals of about 60 or more meters along the sewer pipe at existing inspection chambers or inspection chambers to be built (DE-OS No. 36 20 026). Starting from a manhole, a cutter head is advanced along the pipe to be replaced. A pivot bearing of the cutter head is mounted on the front end of a pipe segment of the new sewer pipe. The new pipe is pressed forward by means of the cylinder units with the cutter head starting from the manhole in the direction of the pipe to be replaced. Other product pipes are attached in succession on the rear end of the new pipe segment. This procedure has the advantage that the sewer pipe to be replaced does not have to be exposed over its entire length, so that the obstruction to traffic is less grave.

Of course, this known device has difficulties with the working of reinforced concrete pipes and the guidance of the cutter head. It is often desired to run the new pipe on the same level as the old pipe. If the new pipe has a larger diameter, its axis is, therefore, higher than that of the old pipe. In addition, sewer pipes are frequently cemented into the ground, whereby the thickness of the concrete usually fluctuates over the circumference. At the top, for example, thickness is the thinnest.

Both of the aforementioned circumstances cause the prior art device to shift slightly to the side or to the top. Thereafter, a radial misalignment of the cutter head hardly can be corrected.

SUMMARY OF THE INVENTION

The object of the present invention is to provide an improved process and device of the aforementioned kind, whereby the above problems are avoided.

With the process of the invention it is achieved in an advantageous manner that the advanced cutter head, attacking at a face of the old buried or enclosed pipe to be worked or removed is always centered relative to such old pipe, even if unilateral forces act on this cutter head owing to the different thicknesses of the wall of the pipe.

The cutter head is pivoted in an advantageous manner by means of a guide mechanism which is mounted on the face of the cutter head and is pressed with adjustable pressure against the inner wall of the old pipe to be worked and is guided slidingly therein.

The cutter head is either pulled or preferably pushed directly behind an inserted replacement pipe.

So that the guide mechanism does not suddenly stand still or jam in the pipe to be worked owing to diameter constrictions, this pipe is calibrated throughout preferably with a separate cutter prior to replacement.

In the case of the device to carry out the process according to the invention, the cutter head is off-centered in an advantageous manner relative to the longitudinal axis of the pipe to be worked, whereby the cutter head provided with the larger outer diameter makes it possible to lay the new pipe with respect to the old pipe either below the level or at the same level. This has the advantage that when only subsections of the sewer system are provided with new larger pipes, there is no shifting to the bottom and thus neither water ledges nor eddies can form.

Furthermore, the device according to the invention is provided with cutting elements which are distributed over the circumference of the guide mechanism and attach directly to the cutting edges of the cutter head and interact with the cutter head. When the cutter head then is rotated, any reinforcing steel is sheared off and comminuted.

BRIEF DESCRIPTION OF THE DRAWINGS

In the following, embodiments and other advantages of the invention are explained in detail with reference to the accompanying drawings, wherein.

DETAILED DESCRIPTION OF THE INVENTION

Figure 1:
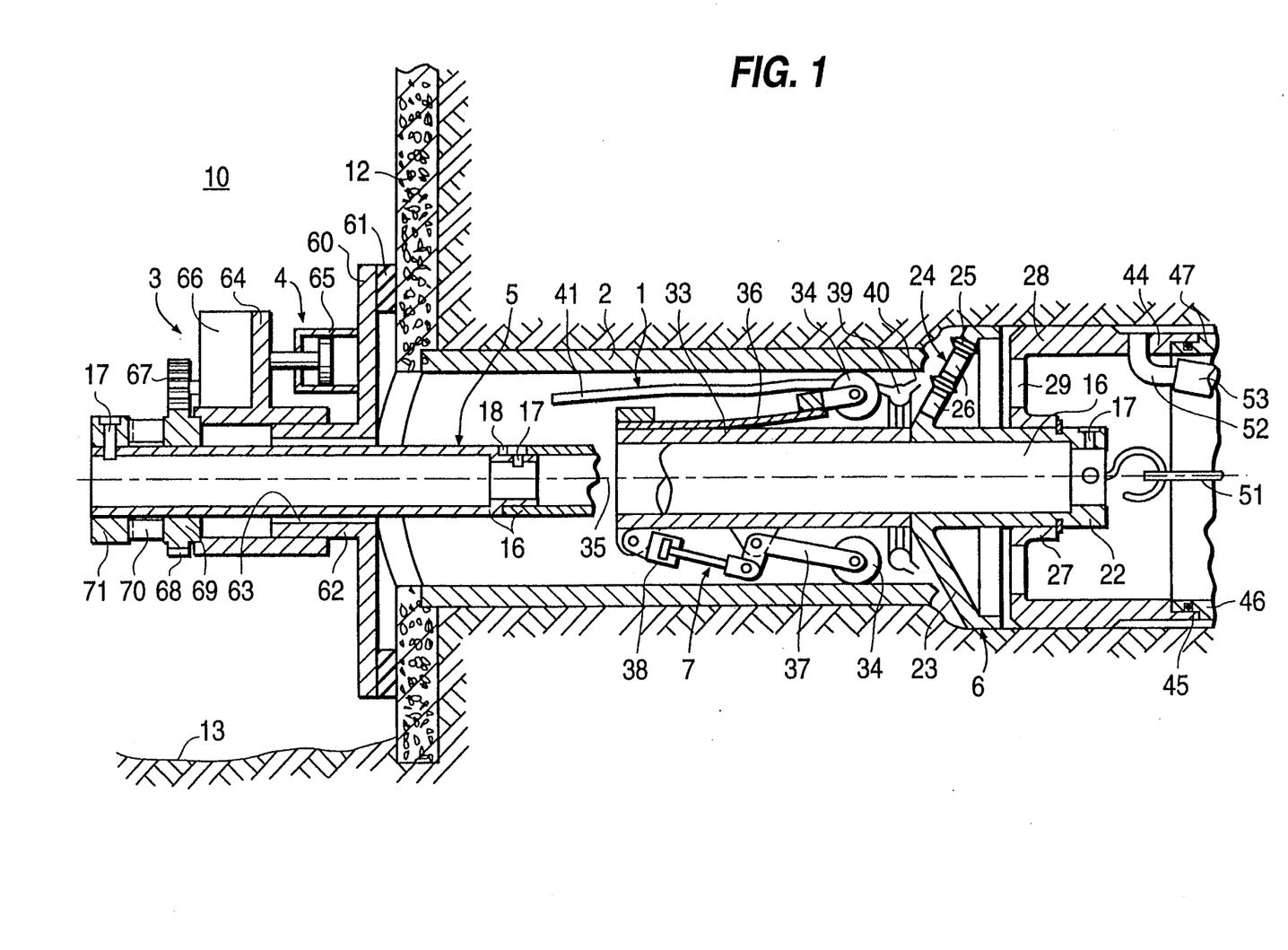
FIGS. 1 and 2 are longitudinal views of two adjacent parts of the device of the invention.
Figure 2:
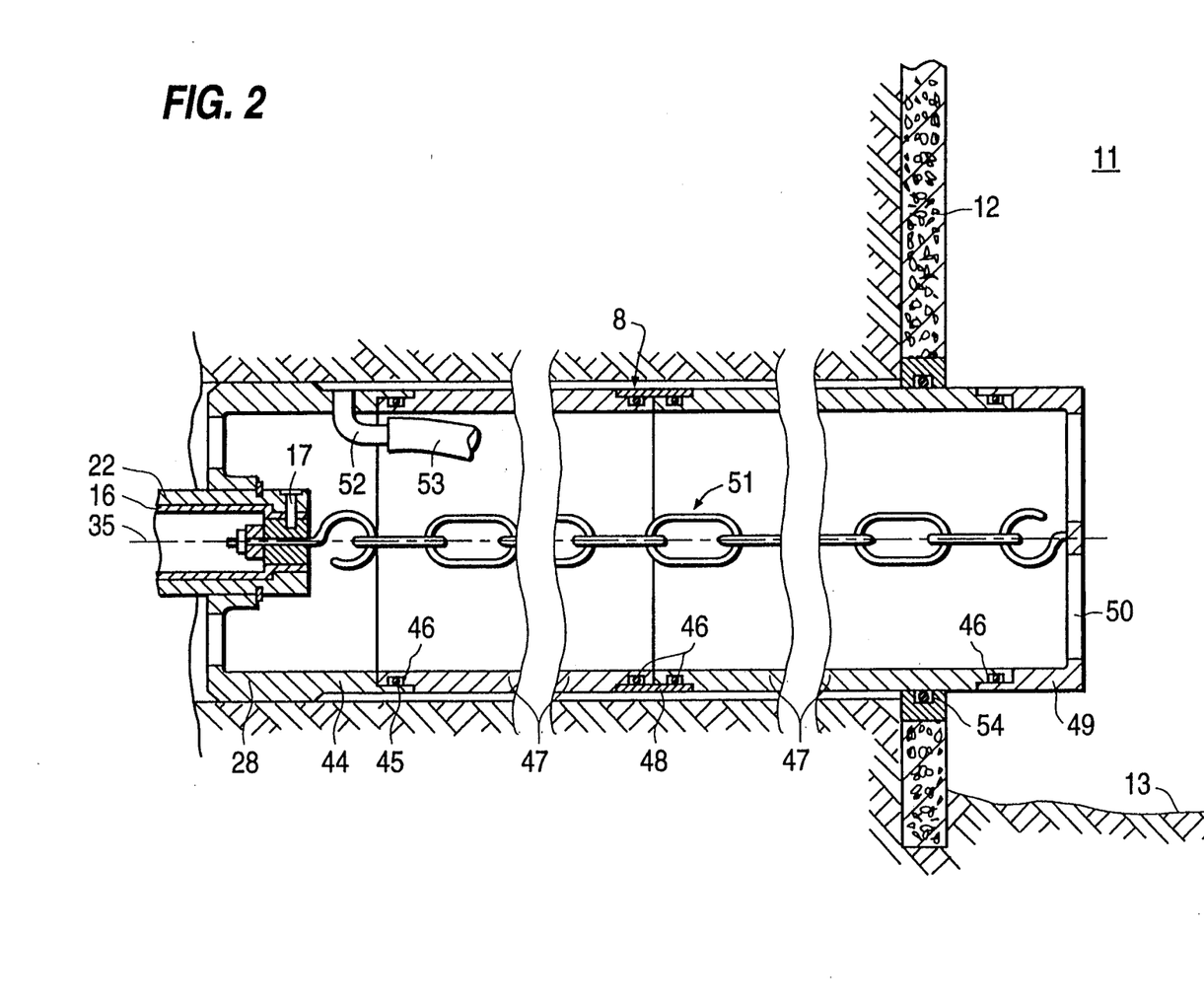

FIGS. 1 and 2 depict diagrammatically a device 1 to replace old or existing sewer pipes 2. The device 1 comprises a rotary drive 3, a stroke drive 4, a pull rod 5, a cutter head 6 and a guide mechanism 7. The device 1 is intended for installing a new sewer pipe 8 in place of the pipe 2 and is installed between two manholes 10, 11 in the sewer system.

The manholes 10, 11 are formed by vertical concrete pipes 12, which in the ready-for-use state are filled at the bottom with concrete up to about the bottom edge of the sewer pipe 2. A layer of mortar is applied on this bottom, and in such layer of mortar is a channel that forms a continuation of the bottom half of the inner surface of the pipe 2. The device 1 and all of the necessary arangements thereof are then erected altogether.

Starting from one of the two manholes 10, 11, the pull rod 5 is assembled from segments 16. The face ends of the segments 16 are connected tension-proof and twist proof in both directions, as indicated by crossbolts 17 in FIG. 1. The segments 16 are depicted as circular-cylindrical pipes, one end of each of which includes a cylindrical extension 18 of smaller diameter in order to receive the adjoining segment 16.

In manhole 11 the guide mechanism 7 is mounted on the rod 5 and is inserted into the sewer pipe 2. Subsequently the cutter head 6 is mounted twist-proof and tension-proof on the free end of the rod 5, for example with other crossbolts 17. The cutter head 6 comprises a hollow cylindrical hub 22 and a conical jacket 23. Several cutting tools 24 are mounted in the jacket 23. The cutting tools are indicated in FIG. 1 as double conical, pivotable rollers 25 coated with hard metal or diamond on the periphery, as known from drilling machines for tunnelling in mining. Depending on the material to be worked, standing tools can also be employed. The jacket 23 has several openings 26 to convey the worked material. A hub 27 of a circular cylindrical, tubular shield 28 can be pivoted on the hub 22 but is mounted thereon immovably longitudinally. Shield 28 and hub 27 are connected together by way of spokes 29. The outer diameter of the shield 28 corresponds to the outer diameter of the jacket 23 and is negligibly larger than the outer diameter of the new pipe 8.

The guide mechanism 7 includes a bearing body 33, in which the rod 16 can be rotated, and to which four rollers 34, which are designed as support elements and are distributed over the circumference, are attached radially moveably. The rollers 34 are braced against the pipe 2. The position of the rollers 34 can be controlled. Thus, the axis of the cutter head 6 can be adjusted horizontally and vertically relative to the axis 35 of the pipe 2. The adjustability of one pair of rollers 34 is merely indicated diagrammatically by pressing the one roller 34 radially to the outside by means of a leaf spring 36 and the opposite roller 34 is radially adjustable by means of a double armed lever 37 and a hydraulic cylinder 38.

Such adjustment can be automated, for example, by means of laser telemetry or also optically, so that any eventual sinking or shifting of the pipe 2 can be compensated for. An annular distributor pipe 39 with a wreath of injection nozzles 40 adjacent to the cutter head 6 can be mounted on the bearing body 33. The nozzles 40 are directed against the cutting tools 24. Water is admitted into the pipe 39 by means of a hose 41.

The rear end of the shield 28 has a cylindrical extension 44 with reduced outer diameter and a cylindrical countersinking 45 to receive sealingly a cylindrical projection 46 of a pipe segment 47 of the new pipe 8 to be pulled in, such pipe segment being called a press pipe. Both ends of each pipe segment have a projection 46. A steel ring 48 is slid over two abutting projections 46 in order to seal and center the same. A ring 49 with a diagonal brace 50, which is connected rotatably to the hub 22 or the rear end of the pull rod 5 by way of a pull element 51, is inserted over the projection 46 of the rearmost pipe segment 47, projecting into the manhole 11. A socket 52, which is connected to the manhole 11 by way of a hose 53, is welded to the extension 44. The pipe 12 of the manhole 11 is sealed relative to the rearmost pipe segment 47 by means of a sealing ring 54.

The drive 3, 4 installed into the manhole 10 has a base plate 60, which is braced against the pipe 12 of the manhole 10 by way of buffer 61 (e.g. made of rubber). The plate 60 can also be strut-braced to ensure anchoring. A prismatic, many sided extension 62, extending in the direction of the axis 35, is welded to plate 60 and has an axial, continuous bore 63. A housing 64 can be slid longitudinally, but non-rotationally on the extension 62. The housing 64 can be slid relative to the plate 60 in the direction of the axis 35 by means of several hydraulic cylinders 65 (or an annular cylinder) distributed over the circumference. The housing 64 carries a hydraulic motor 66 with an output gear 67, which mates with a gear rim 68 of a gearwheel 69, slid on the front end of the pull rod 5. The gearwheel 69 is braced rotatably and is centered on the housing 64. The gearwheel 69 transfers torque and axial thrust by way of a two part bushing 70, both sides of a face of which are toothed radially, to a ring 71, connected twist-proof and axially immoveably, e.g. by way of other crossbolts 17, to the front end of the pull rod 5.

During service the hydraulic motor 66 and the cylinders 65 are pressurized with pressurized oil, so that the cutter head 6 is rotated by way of the rod 5 and is pressed against the front end of the pipe 2 to be replaced. This pipe end and the enveloping stone, dirt and any concrete are comminuted by the cutting tools 24. The worked material is then flushed by means of water from the nozzles 40 through the openings 26 and between the spokes 29 into a new pipe 8 and through this new pipe into the manhole 11. The pipe 8 is subsequently pulled in by means of the pull element 51. To hold the requisite forces to a minimum, an injection medium of approximately the same specific weight as the surrounding soil is injected by way of the socket 52 and the hose 53 into the narrow gap between the outer wall of the pipe 8 and the bore produced with the cutter head 6. A suitable injection medium is, e.g., a bentonite-cement suspension. Bentonite is a ground opaline clay, which with water forms a specifically relatively heavy emulsion, which remains liquid for a prolonged period. The injection medium prevents the bore wall from caving in, because the pressure prevailing in the soil and the pressure gradients can be held low with such injection medium. Thus, the new pipe 8 floats to a degree in the injection medium, as long as it has not yet cured and can be subsequently pulled in with low forces while the cutter head 6 is advancing.

When the stroke of the cylinders 65 is exhausted, the housing 64 is moved back against the plate 60 to an opposite stop and a longer or an additional bushing 70 is inserted. This process is repeated until the next separating point between the rod segments 16 in front of the gearwheel 69 is reached. Then the ring 71 is changed over to the next segment 16 and optionally another pipe segment 47 is attached to the rear end.

To facilitate the expansion of the guide mechanism 7 and the cutter head 6 following entry into the manhole 10, it can be expedient to design the base plate 60 and the housing 64 so as to be dismountable along a plane containing the axis.

In contrast, with the design of the invention modest forces are necessary to advance the new pipe 8, so that that stroke drive 4 can be small and light-weight. Therefore, the drive 3, 4 can be built so small that it fits in a normal sewer manhole 10, 11 that is present in any event. With the solution according to the invention it is also hardly necessary to lift the material to the street surface, so that an obstruction to traffic and the work preparation time can be drastically reduced.

Because with the device of the invention the cutter head 6 is guided by means of the guide mechanism 7 in the pipe 2, the conical front side of the cutter head is self-centered relative to the cutting tools 24, as compared to the state of the art. The danger that the cutter head 6 will move diagonally to the pipe axis 35 is, therefore, virtually ruled out.

With the device according to the invention, the axis of the cutter head with respect to the pipe axis 35 can be corrected in a simple manner and with little effort by means of the guide mechanism 7 braced in the pipe 2, resulting in virtually only the lateral offset, not the parallelism of these axes, being relevant. In the state of the art, in contrast, the cutter head is braced against a new pipe 8 that is forced in. Virtually only the angle of the cutter head with respect to the axis of the new pipe can be corrected, with the result that any lateral shift of the cutter head that has already occurred frequently is hardly correctable at all.

Because in the device of the invention, as compared to the state of the art, almost the entire cross-section of the pipe 8 that has been just pulled in is free for transporting away the worked material, this material can be flooded away in a very simple manner.

The device according to the invention is significantly smaller and less expensive than known press pipe advancing systems. The work preparation for replacement of a sewer pipe is drastically simplified, because there is almost no need to lift to the surface. In contrast to the known devices, the device according to the invention is also suitable for pulling in relatively thin walled and correspondingly less expensive and more commercially available pipes. Therefore, the use of the device according to the invention is very economical.

Figure 3:
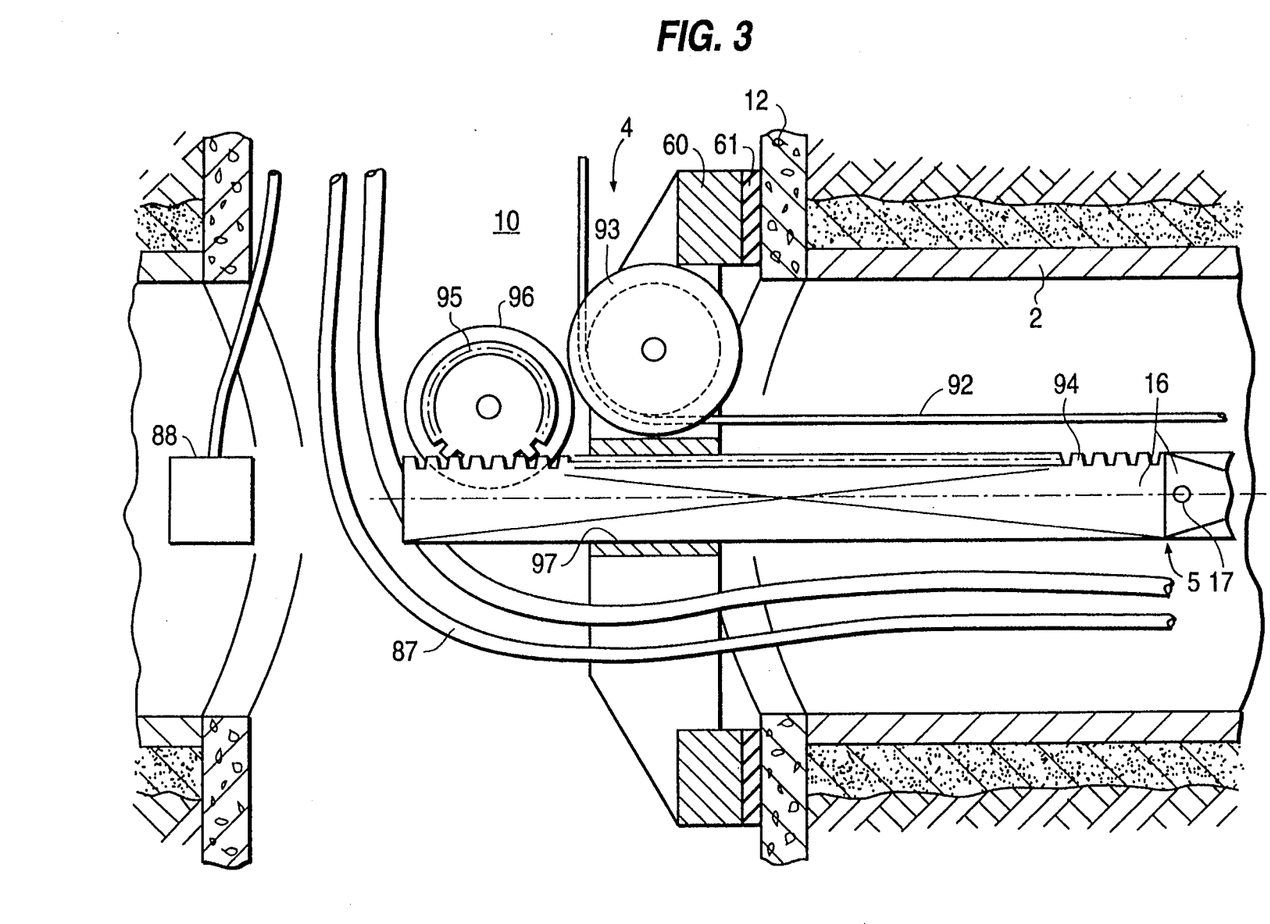
FIGS. 3 and 4 are longitudinal views of two parts of a second embodiment.
Figure 4:
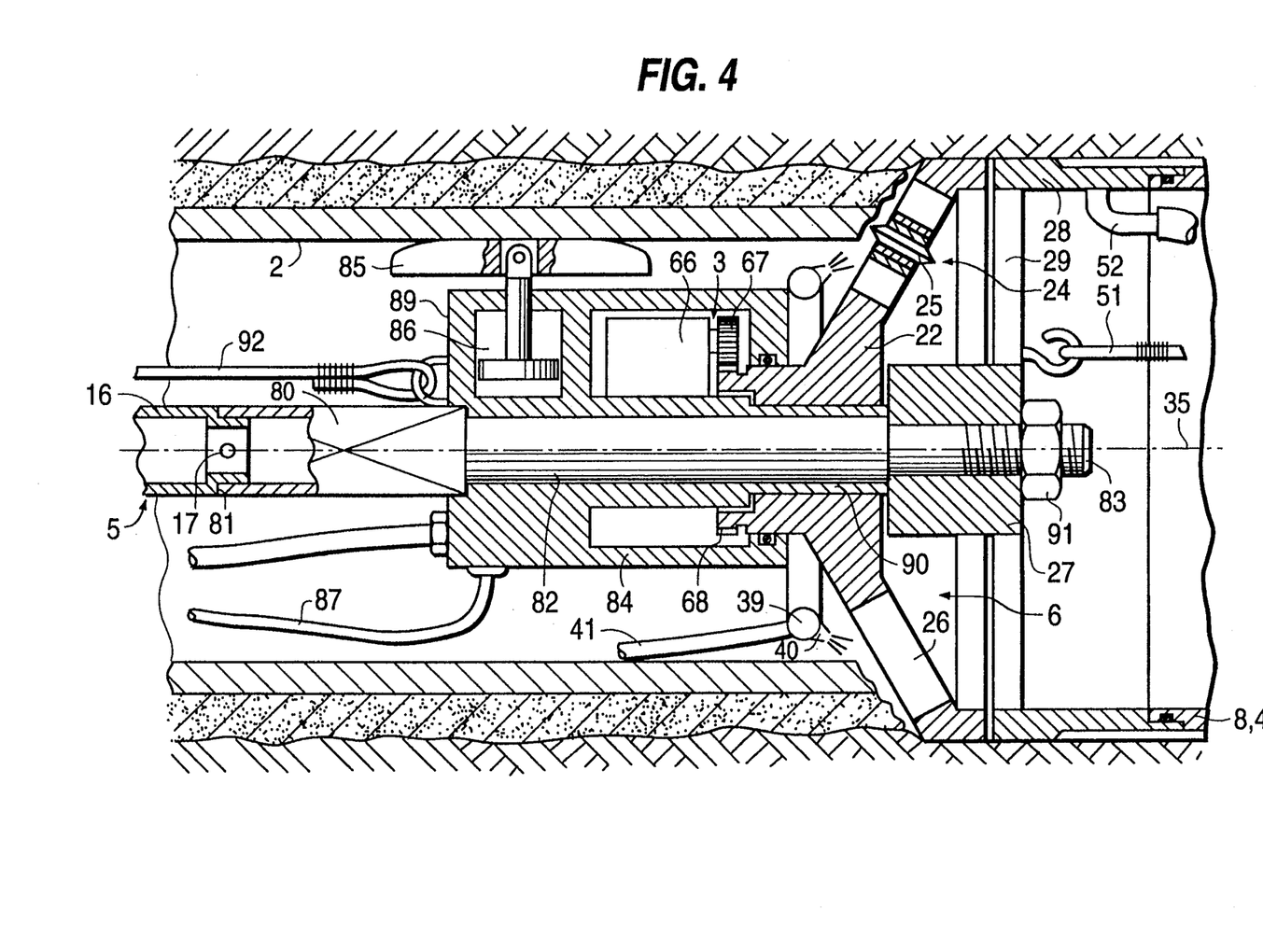

In the embodiment according to FIGS. 3 and 4, analogous parts are provided with the same reference numerals, so that a detailed explanation of these parts is superfluous. The embodiment according to FIGS. 3 and 4 differs primarily from those that according to FIGS. 1 and 2 due to the fact that the rotary drive 3 is at the cutter head 6 and correspondingly the rod 5 is not rotated and the stroke drive 4 is designed differently.

The rod 5 is designed as a segmented rectangular pipe. The rearmost segment 80 has a front rectangular segment 81 and a cylindrical rear segment 82 with a thread lug 83. A housing 84 of the guide mechanism 7 is slid on the segment 82, such housing reaching twist-proof over the segment 81. Here the centering elements are, for example, three skids which are designed as supporting elements and can be adjusted radially by means of a piston-cylinder unit 86. Values (not illustrated) for controlling the units 86 are built into the housing 84 and are activated by a controller by way of an electric line 87 in response to measurement signals of a laser device 88, which is disposed in the manhole 10 and scans a mark on the front side 89 of the housing 84. Thus, the cutter head 6 is automatically guided in a straight line.

In the housing 84 are attached two or, if necessary more, hydraulic motors 66, whose output gears 67 mate with the gear rim 68, attached here to the cutter head 6. The cutter head 6 can be pivoted on a sleeve-shaped extension 90 of the housing 84 and braced axially against the hub 27 of the shield 28. The hub 27 is mounted with a nut 91 on the segment 82.

The stroke drive 4 comprises here a cable winch (not illustrated), which is switched off at the bottom by way of the opening of the manhole 10 and which pulls the housing 84 or the rearmost segment 80 toward the manhole 10 by means of a steel cable 92 over a guide pulley 93 mounted on the base plate 60. Instead of this, the rod 5 can have teeth 94, with which a pinion 95 of a hydraulic motor 96 attached to the base plate 60 meshes.

The base plate 60 has a rectangular opening 97, into which rectangular rod 5 is guided and by way of which the counter torque of the rotary drive 3 is transferred to the pipe 12 of the manhole 10.

The pull element 51 to pull in the new pipe 8 is also a steel cable. It can be expedient not to connect this cable rigidly to the ring 49 (FIG. 2), but rather by way of a cable line that can be operated, e.g. by hand. In this case the new pipe 8 is not pulled along continuously, but rather is pulled forward step-by-step. Thus, the stroke drive 4 for the cutter head 6 can be relieved of the force required to pull in the new pipe 8.

At variance with the embodiment shown in FIGS. 3 and 4, the rectangular rod 5 can also be disposed stationarily between the manholes 10 and 11 during the advancing operation, wherein in this case the housing 84 of the guide mechanism 7 has a continuous rectangular opening, which can be slid longitudinally, but twist-proof on the rod 5. The extension 90 is not longer and exhibits on the rear the correspondingly larger thread 83, and the hub 27 is mounted on this extension 90. This variation has the advantage that the advancing operation does not have to be interrupted to work segments 16 in the manhole 10.

In both of the above described embodiments it is possible to ensure the device during service against an eruption of ground water. To this end, a somewhat pressure-tight partition is installed in the pipe 8 that has just been pulled in. Another partition with a flexible rubber lip sealing against the pipe 2 is mounted around the housing 84 of the guide mechanism 7. A sludge pump conveys away the wash water with worked material. A compressed air line opens into the side of one of the two partitions facing the cutter head 6. By supplying compressed air a pressure corresponding to the ground water level is maintained in the space between the two partitions. If the pipe 2 runs, for example, three meters below the ground water level, an overpressure of about 0.3 bar would be necessary.

The embodiments according to FIGS. 5 to 9 are especially suitable when the material around the pipe to be replaced collapses easily. In such case the friction to be overcome for the new pipe to be pulled in can be a multiple of the axial force to be generated at the cutter head, despite the use of washing agents. In such case violent pressing is necessary to advance the new pipes, which are installed expediently in a pit-in order to thrust the new pipe into the cut bore.

Figure 5:
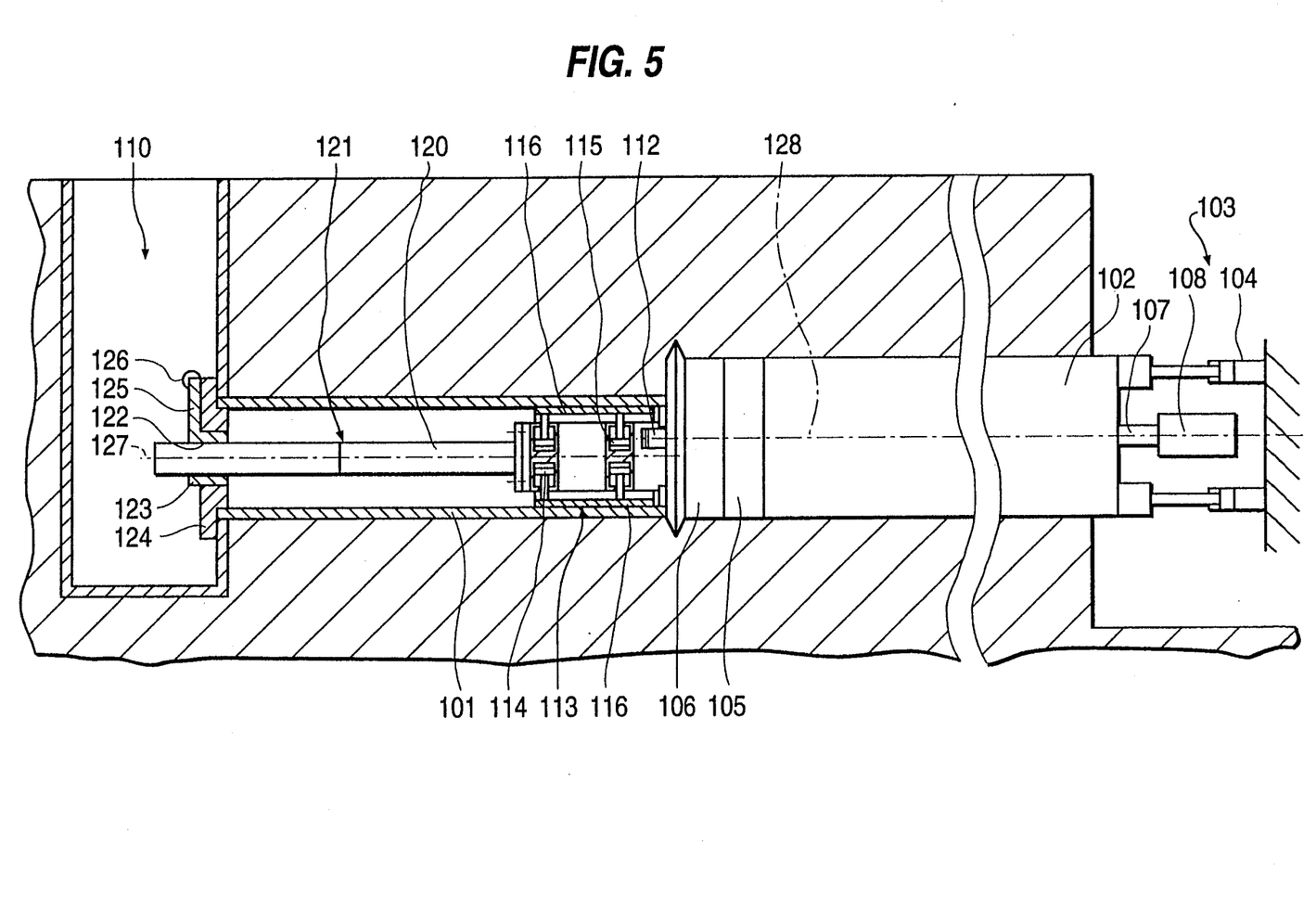
FIG. 5 is a simplified longitudinal view of a third embodiment.

In the embodiment according to FIG. 5, the sewer pipe 101, which is defective or undersized, is to be replaced by a new and larger sewer pipe 102 on the same level. Pipe 102 is advanced starting from a manhole or pit 103 with a known hydraulic press device 104. At the front end a cutter head 106 is braced axially against a ring 105 mounted on the pipe 102. The cutter head is driven by way of a shaft 107 or directly by means of a hydraulic motor 108.

The cutter head 106 has a journal 112. The journal 112 can be rotated in a guide mechanism 113. The guide mechanism 113 can be adjusted radially by means of at least two piston-cylinder units 114, 115 with respect to at least two supporting elements with chucks 116. In this manner the cutter head 106 is guided in the pipe 101 to be worked. The cylinders 114, 115 can be controlled, e.g. automatically by means of laser telemetry. In the illustrated embodiment the two bottom cylinders 115, can set, e.g., periodically or continuously the guide mechanism 113 to the correct eccentricity, optionally also to the correct tilt, whereas the upper cylinders 114, 115 press with constant force of, e.g., one ton the two chucks 116 against the wall of the pipe. In this manner a chatter-free operation of the cutter head 106 is obtained. The chucks 116 extend as far as the immediate vicinity of the cutter head 106 and extend in the shape of a drum to the inner wall of the pipe. This is important especially when the pipe 101 is reinforced with steel. In addition, it is expedient if for different pipe diameters chucks 116, whose dimensions are correspondingly different, or even sets of guide mechanisms 113 of different sizes are used, so that the chucks rest uniformly against the inner wall of a pipe 101.

A rectangular pipe 121, assembled from segments 120, is screwed to the front end of the guide mechanism 113. Analogous to the embodiment according to FIG. 3, this pipe can be slid but locked against rotation in a rectangular opening 122 of a hub 123 of a safety device against rotation. The hub 123 can be pivoted in a bearing body 124 braced against the wall of a manhole 110 and immoveably mounted in the axial direction. An arm 125 is mounted on the hub 122, such arm can be adjusted by means of a cylinder unit 126 around an axis 127 eccentrically to the axis 128 of an new pipe 102, and the bearing journal 112 can be adjusted, therefore, in two coordinate directions. Rectangular pipe 121 is used preferably for calibration, provided prior to working, by mounting a cutter head, whose diameter is approximately identical to that of the pipe to be replaced, on the front side of the rectangular pipe, and the cutter head is pushed through at a specific speed by means of rectangular pipe 121. The latter is then already installed for working.

Figure 6:
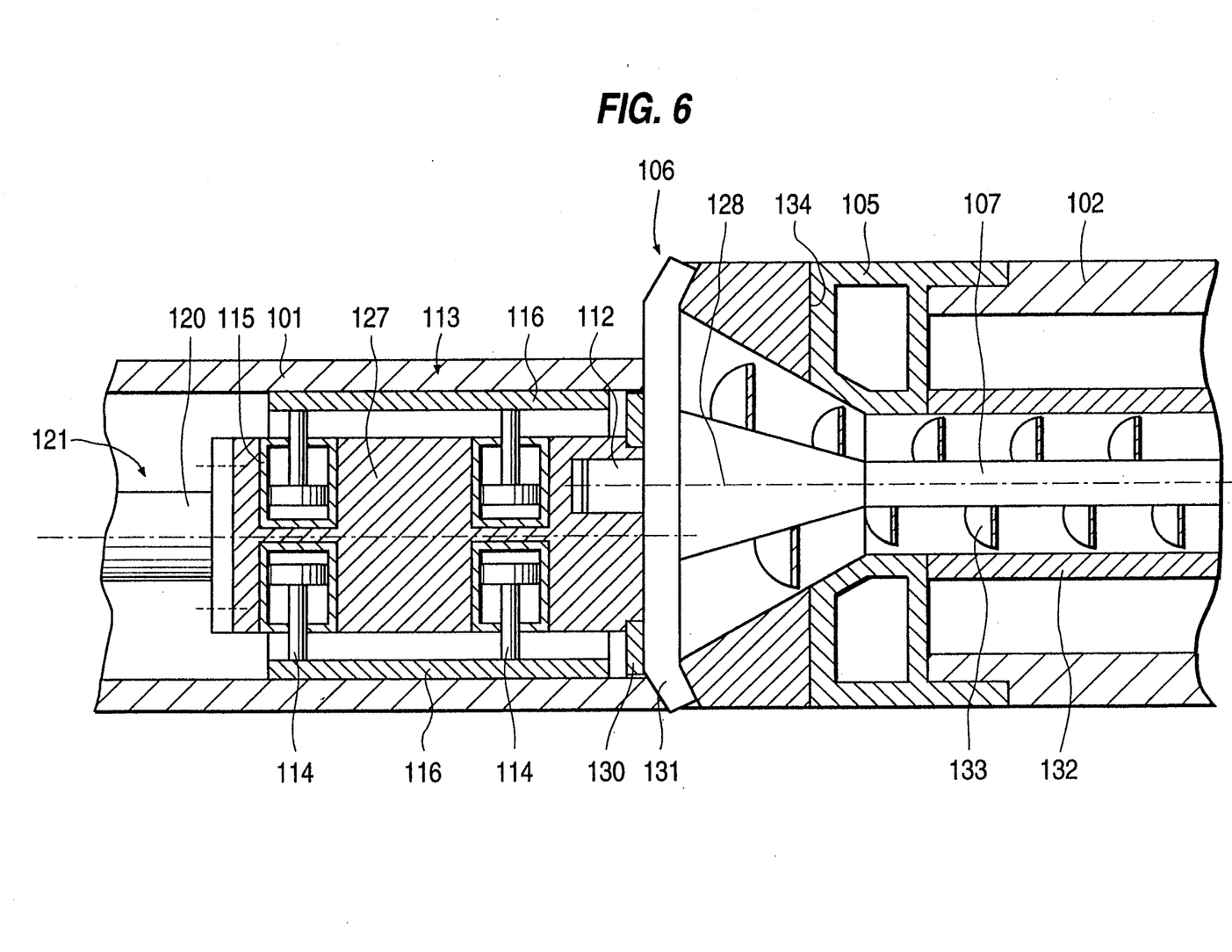
FIG. 6 is an enlarged view of one part of the embodiment according to FIG. 5.

In FIG. 6 the positioning of the cutter head 106 is shown in somewhat greater detail. The chucks 116 have, facing the cutter head 106, a rim 130 with cutting elements 138 (FIG. 8) with cutting edges, e.g. made of hard metal, which interact with chisel-like working tools 131 of the cutter head 106 in order to comminute the reinforced iron. The drive shaft 107 of the cutter head 106 extends in an inner pipe 132 and carries a spiral conveyor 133 to transport away the worked material. To reliably prevent the guide mechanism from twisting, it is also possible to advance it step-by-step while the cutter head 106 is standing still and to subsequently press the chucks 116 firmly against the pipe 101. The cutter head 106 is braced by way of an axial bearing 134 (merely indicated schematically) against a ring 105 designed as a machine pipe. Such axial bearing can be designed either in such a manner that the cutter head 106 can be freely moved radially relative to the ring 105, or depending on the application, to guide the cutter head 106 radially on the ring 105.

Figure 7:
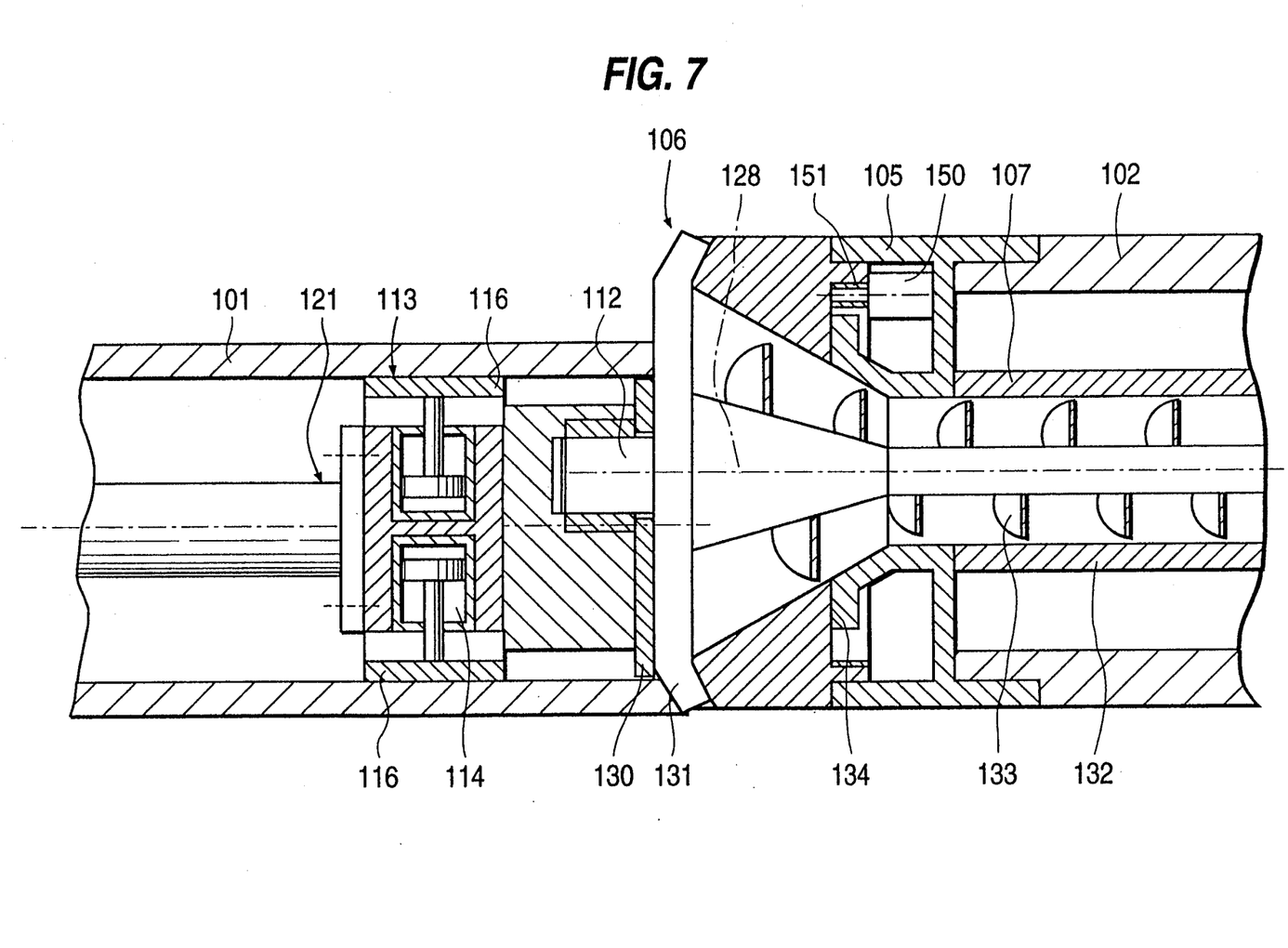
FIG. 7 is a longitudinal view of a fourth embodiment.

FIG. 7 shows another embodiment, where analogous components have reference numerals identical to the embodiment according to FIGS. 5 and 6, so that a detailed description of these parts is superfluous. The embodiment according to FIG. 7 differs from that according to FIGS. 5 and 6 primarily in that the cutter head 106 is driven by a motor 150, which is arranged directly behind the cutter head. The motor 150 is integrated in the ring 105 on the side of the spiral conveyor 107 and drives the cutter head 106 forward by way of a toothed wheel gearing 151. This design has the advantage of being able to transfer more power through this direct drive of the cutter head 106 than with an external drive.

Figure 8:
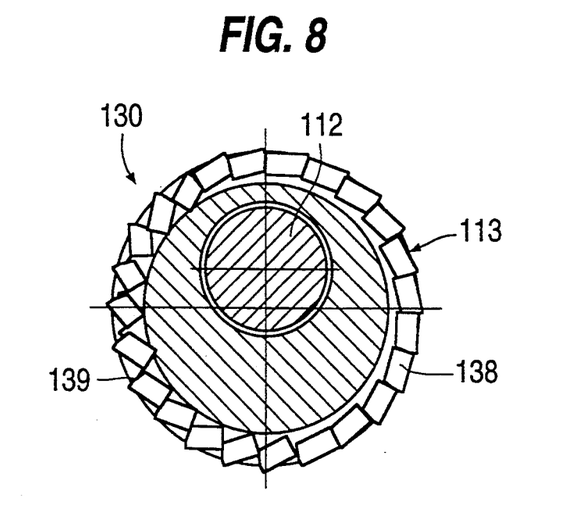
FIG. 8 is a front view of a cutting ring.

FIG. 8 is a front view of the blade rim 130. As is apparent, the cutting elements 138 of the rim 130 are distributed in a dense sequence over the rim circumference. Cutting or shearing edges 139 have a variable slope relative to the radial direction over the circumference, because the cutter head 106 rotates eccentrically.

Figure 9:
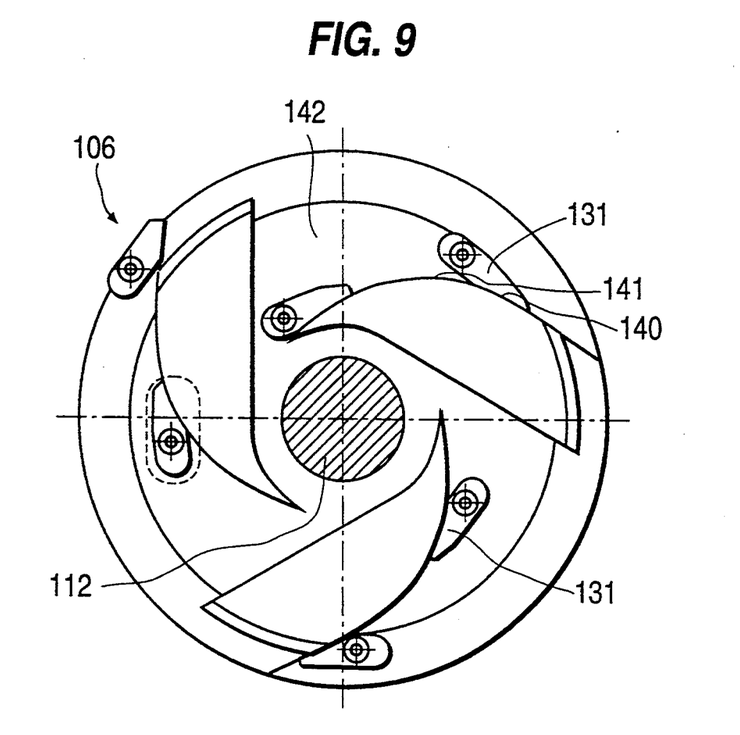
FIG. 9 is a front view of a cutter head.

FIG. 9 depicts diagrammatically a front view of the cutter head 106 with the chisel-like working tools 131, whose cutting and shearing edges 140 are arranged along spiral inlet edges 141 of three openings 142 of the cutter head 106. The spirals 133 of the spiral conveyor shown in FIG. 6 attach to these inlet edges 141.

The pipe 101 to be replaced can be calibrated first so that the centering head with the supporting elements 116 can be advanced along the entire length of the pipe 1. During this calibrating operation any protrusions projecting into the interior of the pipe 101, e.g. during lateral feeding, are cut off with the cutter ring, which corresponds to the inner diameter of the pipe 101 to be worked.

The present invention is explained with regard to the above described embodiments. The guide mechanism could, of course, also be constructed in a different manner, for example as a pilot bar which is rigidly connected to the cutter head and which rotates in the pipe to be worked. The bar could be calibrated to the effect that the front side of the pilot bar includes an additional blade rim, with which in accordance with the calibration any irregularities in the pipe would be removed simultaneously during the working operation itself.

I claim:

1. In a process of replacing an enclosed old pipe with a new pipe, said process including advancing a cutter head along said old pipe and operating said cutter head to cut away and thereby remove said old pipe, and supplying said new pipe behind said advancing cutter head, the improvement comprising:

controlling the direction of advancement of said cutter head to accurately follow said old pipe by guiding said advancement directly along an inner wall surface of said old pipe, said guiding comprising mounting a guide mechanism on a leading end of said cutter head, inserting said guide mechanism into said old pipe forwardly of said cutter head and urging said guide mechanism outwardly against said inner wall surface of said old pipe, such that during advancement of said cutter head said guide mechanism follows said inner wall surface and constrains said cutter head to precisely follow said guide mechanism along said old pipe.

2. The improvement claimed in claim 1, further comprising adjusting the pressure of outward urging of said guide mechanism.

3. The improvement claimed in claim 1, wherein said guide mechanism includes at least two supporting elements, and said urging comprises pressing said supporting elements radially outwardly to maintain said guide mechanism centered with respect to said inner wall surface.

4. The improvement claimed in claim 1, wherein said advancing comprises pulling said cutter head in said direction axially of said old pipe.

5. The improvement claimed in claimed 1, wherein said advancing comprises pushing said cutter head in said direction by said new pipe.

6. The improvement claimed in claim 1, wherein said old pipe comprises a buried sewer pipe.

7. The improvement claimed in claim 6, wherein said cutter head and said new pipe have a diameter greater than that of said old pipe, and said cutter head cuts away material surrounding and burying said old pipe.

8. In an apparatus for replacing an enclosed old pipe with a new pipe, said apparatus including a cutter head to be advanced along the old pipe while being operated to thereby cut away and remove the old pipe, with a new pipe being supplied behind the thus advancing said cutter head, the improvement comprising:

a guide mechanism mounted on a leading end of said cutter head such that said cutter head is rotatable relative to said guide mechanism, said guide mechanism extending from said cutter head to fit against an inner wall surface of the old pipe and thereby to be centered relative thereto, and thus to guide the direction of advancement of said cutter head to accurately follow the old pipe.

9. The improvement claimed in claim 8, further comprising a motor for rotating said cutter head.

10. The improvement claimed in claim 9, wherein said motor is connected indirectly to said cutter head at a position to be outwardly of the old pipe.

11. In an apparatus for replacing an enclosed old pipe with a new pipe, said apparatus including a cutter head to be advanced along the old pipe while being operated to thereby cut away and remove the old pipe, with a new pipe being supplied behind the thus advancing said cutter head, the improvement comprising:

a guide mechanism mounted on said cutter head and extending therefrom to fit against an inner wall surface of the old pipe and thereby to be centered relative thereto, and thus to guide the direction of advancement of said cutter head to accurately follow the old pipe, said guide mechanism comprising a bearing body connected to said cutter head to enable relative rotation therebetween, and at least two supporting elements mounted on said bearing body for adjustable movement radially thereof to be pressed against the inner wall surface of the old pipe at adjustable pressure, said supporting elements together defining a substantially cylindrical outer shape.

12. The improvement claimed in claim 11, further comprising piston-cylinder units mounting said supporting elements for radially adjustable movement relative to said bearing body, and each said supporting element has an outer partially cylindrical surface to be pressed against the inner wall surface of the old pipe.

13. In an apparatus for replacing an enclosed old pipe with a new pipe, said apparatus including a cutter head to be advanced along the old pipe while being operated to thereby cut away and remove the old pipe, with a new pipe being supplied behind the thus advancing said cutter head, the improvement comprising:

a guide mechanism mounted on said cutter head and extending therefrom to fit against an inner wall surface of the old pipe and thereby to be centered relative thereto, and thus to guide the direction of advancement of said cutter head to accurately follow the old pipe, said guide mechanism being adjustable relative to said cutter head in a direction radially thereof.

14. In an apparatus for replacing an enclosed old pipe with a new pipe, said apparatus including a cutter head to be advanced along the old pipe while being operated to thereby cut away and remove the old pipe, with a new pipe being supplied behind the thus advancing said cutter head, the improvement comprising:

a guide mechanism mounted on said cutter head and extending therefrom to fit against an inner wall surface of the old pipe and thereby to be centered relative thereto, and thus to guide the direction of advancement of said cutter head to accurately follow the old pipe, said cutter head having an axis of rotation positioned eccentrically of a longitudinal axis of said guide mechanism, and said cutter head having an outer diameter greater than a maximum outer diameter of said guide mechanism.

15. In an apparatus for replacing an enclosed old pipe with a new pipe, said apparatus including a cutter head to an advanced along the old pipe while being operated to thereby cut away and remove the old pipe, with a new pipe being supplied behind the thus advancing said cutter head, the improvement comprising:

a guide mechanism mounted on said cutter head and extending therefrom to fit against an inner wall surface of the old pipe and thereby to be centered relative thereto, and thus to guide the direction of advancement of said cutter head to accurately follow the old pipe, said guide mechanism having circumferentially distributed cutting elements cooperable with said cutter head to comminute reinforcements in the old pipe.

16. In an apparatus for replacing an enclosed old pipe with a new pipe, said apparatus including a cutter head to be advanced along the old pipe while being operated to thereby cut away and remove the old pipe, with a new pipe being supplied behind the thus advancing said cutting head, the improvement comprising:

a guide mechanism mounted on said cutter head and extending therefrom to fit against an inner wall surface of the old pipe and thereby to be centered relative thereto, and thus to guide the direction of advancement of said cutter head to accurately follow the old pipe; and a device to prevent rotation of said guide mechanism.

17. The improvement claimed in claim 16, wherein said device comprises a rod having a first end connected to said guide mechanism and a second end leading through the old pipe to be held at a manhole at an end thereof.

18. In an apparatus for replacing an enclosed old pipe with a new pipe, said apparatus including a cutter head to be advanced along the old pipe while being operated to thereby cut away and remove the old pipe, with a new pipe being supplied behind the thus advancing said cutter head, the improvement comprising:

a guide mechanism mounted on said cutter head and extending therefrom to fit against an inner wall surface of the old pipe and thereby to be centered relative thereto, and thus to guide the direction of advancement of said cutter head to accurately follow the old pipe, forward and rearwards ends of said cutter head being sealed to define a sealed space maintained at an overpressure.

19. In a process of replacing an enclosed old pipe with a new pipe, said process including advancing a cutter head along said old pipe and operating said cutter head to cut away and thereby remove said old pipe, and supplying said new pipe behind said advancing cutter head, the improvement comprising:

prior to cutting away of said old pipe by said cutter head, reaming out the interior of said old pipe by a cutter separate from said cutter head, and thereby providing said interior of said old pipe to be of approximately constant diameter; and controlling the direction of advancement of said cutter head to accurately follow said old pipe by guiding said advancement directly along an inner wall surface of said old pipe.

20. The improvement claimed in claim 19, wherein a guide mechanism is mounted on a leading end of said cutter head, and said guiding comprises inserting said guide mechanism into said old pipe forwardly of said cutter head and urging said guide mechanism outwardly against said inner wall surface of said old pipe, such that during advancement of said cutter head said guide mechanism follows said inner wall surface and constrains said cutter head to precisely follow said guide mechanism along said old pipe.

21. The improvement claimed in claim 20, further comprising adjusting the pressure of outward urging of said guide mechanism.

22. The improvement claimed in claim 20, wherein said guide mechanism includes at least two supporting elements, and said urging comprises pressing said supporting elements radially outwardly to maintain said guide mechanism centered with respect to said inner wall surface.

23. The improvement claimed in claim 19, wherein said advancing comprises pulling said cutter head in said direction axially of said old pipe.

24. The improvement claim in claim 19, wherein said advancing comprises pushing said cutter head in said direction by said new pipe.

25. The improvement claimed in claim 19, wherein said old pipe comprises a buried sewer pipe.

26. The improvement claimed in claim 25, wherein said cutter head and said new pipe have a diameter greater than that of said old pipe, and said cutter head cuts away material surrounding and burying said old pipe.

27. In an apparatus for replacing an enclosed old pipe with a new pipe, said apparatus including a cutter head to be advanced along the old pipe while being operated to thereby cut away and remove the old pipe, with a new pipe being supplied behind the thus advancing said cutter head, the improvement comprising:

a guide mechanism mounted on said cutter head and extending therefrom to fit against an inner wall surface of the old pipe and thereby to be centered relative thereto, and thus to guide the direction of advancement of said cutter head to accurately follow the old pipe; and a motor for rotating said cutter head and connected directly thereto at a position to advance therewith along the old pipe.

* * * * *